Patented Nov. 4, 1941

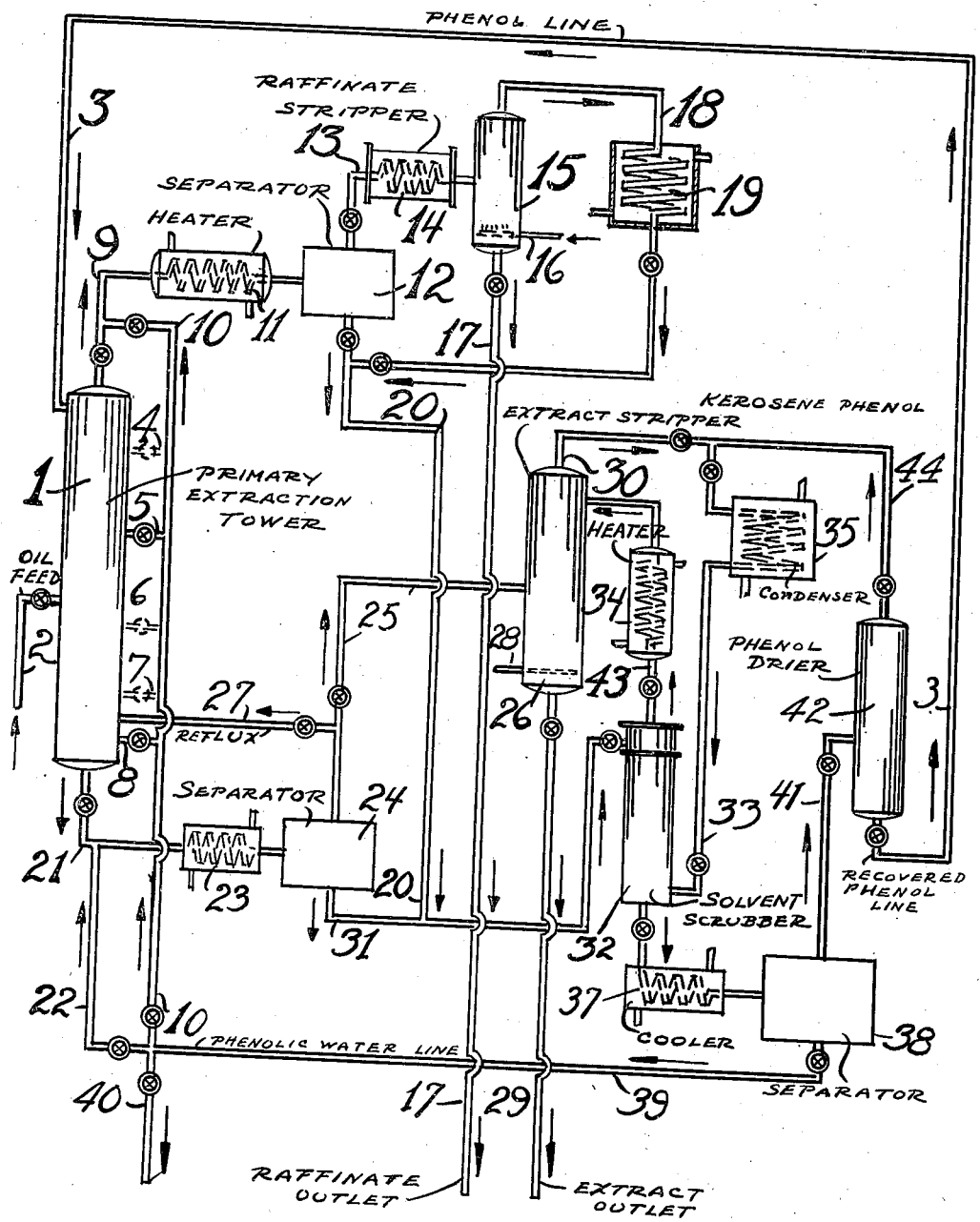

2,261,780

UNITED STATES PATENT OFFICE 2,261,780

SOLVENT TREATING PROCESS

James M. Whiteley, Jr., Westfield, N. J., assignor to Standard Oil Development Company, a corporation of Delaware Application March 4, 1939, Serial No. 259,737

6 Claims. (Cl. 196—13)

The present invention relates to the solvent treatment of mineral oils. It is especially concerned with an improved process of solvent treating petroleum oils in which the primary solvent is recovered without the necessity of distillation. In accordance with the present invention, petroleum oils are treated with selective primary solvents selected from the class of solvents which have a preferential selectivity for the relatively more aromatic or hydrogen-poor constituents as compared to the relatively more paraffinic or hydrogen-rich constituents under conditions to form a raffinate phase and a solvent extract phase. The respective phases are separated and oil removed therefrom by the addition of water. The separated primary solvent is then re-extracted with a secondary solvent in order to remove the remaining oil therefrom.

It is well known in the art to treat petroleum oils and the like with various solvents which have the ability to segregate these oils into their respective constituents as measured by a difference in chemical and physical properties. For example, it is known to treat petroleum oils with solvents or solvent mixtures selected from the class of solvents which have a preferential selectivity for the relatively more aromatic or hydrogen-poor constituents as compared to the relatively more paraffinic or hydrogen-rich constituents. Solvents of this class are, for example, phenol, furfural, sulfur dioxide, cresol, nitrobenzene, aniline, beta beta dichlor diethyl ether, and the like. It is also known to use these solvents in combination with other substances, as for example, in combination with liquid normally gaseous hydrocarbons such as propane and the like. Although a batch or semi-batch operatoin is entirely satisfactory, the usual practice is to contact the oil and solvent in a countercurrent tower treating process. In this operation, the heavier phase, usually the solvent, is introduced into the top of a countercurrent treating tower, while the lighter phase, usually the oil, is introduced into the bottom of said tower. These phases flow in a countercurrent relationship. Efficient contacting between the phases is usually secured by suitable contacting and distributing means. Conditions are so adjusted as to form a solvent poor or raffinate phase, highly paraffinic in nature, and a solvent rich or extract phase, highly aromatic in nature. The respective phases are separated and the solvent is usually separated from the extract and raffinate respectively by distillation.

The removal of the solvent from the raffinate and extract phases by distillation has not been entirely satisfactory since solvents which have desirable characteristics have relatively high specific and latent heats. Thus, solvent treating operations have been limited to some extent by the costs of the recovery of the selective solvent from the treated oil. Thus, in order to lower operating cost and to create a more widespread application of solvent treating operations, numerous proposals have been made in order to eliminate or modify the distillation step. For example, it has been proposed to re-extract the solvent extract and raffinate phases with a secondary solvent having relatively low specific and latent heats which will have a preferential selectivity for the raffinate and extract respectively as compared to the primary solvent. This process, likewise, has not been entirely satisfactory since the known secondary solvents do not completely remove the last traces of the highly aromatic constituents from the primary solvent. Thus, the concentration of the highly aromatic constituents continuously builds up in the primary solvent, necessitating replacement of the same or purification by distillation and the like. In addition, the amount of secondary solvent required is quite large and the resulting economies have not induced a more widespread use of solvent treating operations. Another method of separating the selective solvents from the oil is to add a precipitant to the solvent extract mixture which precipitates the oil out of the solvent and to subsequently separate the solvent and precipitant. This operation has not had widespread application since to obtain a fairly complete precipitation the amount of precipitant required is excessive.

I have now discovered a process of recovering the primary solvent in a highly purified state in an economical manner without the necessity of distilling the same. My process comprises a two-stage operation in which a precipitant is first added in relatively small volumes to the solvent extract mixture. This causes the precipitation of a large portion of the oil from the primary solvent. The primary solvent mixture is then scrubbed with the secondary solvent in order to remove the remaining oil from the solvent. The amount of precipitant and the amount of secondary solvent used are both quite low. The primary solvent is recovered in a relatively pure state and the operation is considerably more economical than any operation known in the art.

The process of my invention may be readily understood by reference to the attached drawing illustrating one modification of the same. Feed oil, which for the purposes of description is assumed to be a petroleum lubricating oil, is introduced into primary extraction tower 1 by means of feed line 2. The feed oil flows upwardly through tower 1 and contacts downflowing solvent which is introduced into tower 1 by means of feed line 3. The solvent, for the purposes of the description, is taken to be phenol. Conditions in tower 1 are adapted to secure the formation of a solvent poor or raffinate phase and a solvent rich or extract phase. Water is introduced into tower 1 at more than one stage, preferably above and below the oil feed inlet by means of lines 4, 5, 6, 7, and 8 respectively. The raffinate phase is withdrawn from tower 1 by means of line 9 and mixed with additional quantities of water introduced by means of line 10. The mixture is then heated in heater 11 and introduced into separator tank or centrifuge 12. The oil phase containing a relatively small amount of phenol is withdrawn from separator 12 by means of line 13, heated by means of heater 14 and then introduced into raffinate stripper 15. Steam is introduced into raffinate stripper 15 by means of line 16 in order to remove the last traces of phenol. The solvent free raffinate is withdrawn from raffinate stripper 15 by means of line 17. The solvent and steam are removed from raffinate stripper 15 by means of line 18, condensed in condenser 19 and then mixed with the phenol water phase which is withdrawn from separator tank or centrifuge 12 by means of line 20.

The solvent extract phase is withdrawn from tower 1 by means of line 21 and treated in a similar manner. The solvent extract is mixed with additional quantities of water introduced into line 21 by means of line 22. This mixture is then heated and mixed in coil 23 and introduced into solvent separator tank or centrifuge 24. The oil phase containing a relatively small amount of the solvent is withdrawn from extract separator 24 by means of line 25 and introduced into extract stripper 26. It may be desirable to return a portion of the oil phase to tower 1 by means of line 27. Steam is introduced into extract stripper 26 by means of line 28 in order to remove the last traces of solvent from the extract. Solvent-free extract is withdrawn from extract stripper 26 by means of line 29 and the stripped solvent and steam removed overhead by means of line 30. The phenol water phase is removed from extract separator tank or centrifuge 24 by means of line 31 and mixed with the solvent water phase withdrawn from raffinate separator tank or centrifuge 12. The combined solvent water phases from separator tanks 12 and 24 are then introduced into solvent scrubber 32 by means of line 31. In solvent scrubber 32 the combined solvent water phases are re-extracted with a solvent which has a preferential selectivity for the petroleum oil as compared to the solvent and water. For purposes of description, it is assumed that the secondary solvent is a highly paraffinic petroleum naphtha boiling in the range from about 300° F. to 500° F. The secondary solvent is introduced into solvent scrubber 32 by means of line 33. The secondary solvent phase containing the remaining oil is removed from solvent scrubber 32 by means of line 43. This phase is heated in heater 34 and introduced into the upper section of extract stripper 26. The secondary solvent is removed overhead by means of line 30 and the extract removed with the extract phase by means of line 29. The secondary solvent removed by means of line 30 is condensed in condenser 35 and recycled to solvent scrubber 32. The phenol water phase free of oil is withdrawn from solvent scrubber 32, cooled in cooler 37 and then introduced into separator tank or centrifuge 38. Phenolic water is withdrawn from separator tank 38 by means of line 39 and used for injection into solvent treating tower 1 and for injection into the raffinate phase and solvent extract phase removed from tower 1. Excess water produced by the injection of steam into the raffinate stripper and extract stripper may be withdrawn by means of line 40 and the phenol recovered by any suitable means. The phenol phase is withdrawn from separator tank 38 by means of line 41 and introduced into phenol drier 42. Phenol and water are removed from phenol drier 42 by means of line 44 and mixed with the overhead from extract stripper 26. Anhydrous phenol or phenol of any desired low water content is withdrawn from phenol drier 42 by means of line 3 and introduced into the top of tower 1.

It is to be understood that the conditions and method of operating in accordance with the process of the present invention may be widely varied. The invention is applicable for the treatment of petroleum oils, although particularly desirable results are secured in the treatment of petroleum oils boiling in the lubricating and gas oil ranges. Any phenolic type or similar solvent which is wholly or partially soluble in water may be used. The quantity of solvent used will vary, depending upon the particular solvent used, as well as upon the petroleum oil being treated and the yield and quality of products desired. In general, it is preferred to use from one-half to 4 volumes of solvent per volume of oil.

It is preferred to introduce the solvent either dry or containing a low concentration of water at one end of the countercurrent treating system which may be either a column or series of stages. Water is injected preferably at a plurality of points above or below or on each side of the stage at which the feed oil is introduced. The quantity of water introduced will depend upon the oil being treated, the solvent being used, as well as upon the temperature and pressure conditions employed. When treating a lubricating oil distillate with phenol, it is preferred to introduce from 3 to 15% of water, based upon the solvent being used. Temperature and pressure conditions on the countercurrent treating system will vary depending upon the particular solvent being used, the character of the oil being treated, and the yield and quality of the products desired. In general, atmospheric pressure or a pressure sufficient to maintain all materials in the liquid phase and a temperature between the complete miscibility temperature and the melting point of the solvent are employed. For example, when employing phenol as a primary solvent, it is preferred to maintain a constant temperature throughout the tower in the range from about 80° F. to 250° F.

The amount of water added to the raffinate phase likewise will depend upon the above-named factors and will vary considerably. In general, it is preferred to add from 10% to 20% of water, based upon the total quantity of raffinate. The raffinate phase and the added water are then heated to a temperature at which an oil phase will separate substantially free of solvent. It has been found, for example, that when 10% to 20% of water is added, based upon the total volume of raffinate, and when using phenol as the selective solvent, especially desirable results are secured when the mixture is heated to a temperature in the range from about 175° F. to 225° F. The temperatures maintained in the raffinate stripper and the quantity of steam introduced are adjusted to produce a solvent-free raffinate.

The quantity of water added to the extract phase likewise will depend upon various factors and may vary considerably. The quantity of water added, based upon the total volume of solvent extract, may vary from about 25% to 150%. However, in order to secure a desirable operation, the quantity of water added should not exceed 50% based upon the total quantity of solvent extract. The solvent extract phase after the addition of the water is heated to a temperature at which an oil phase substantially free of solvent will be secured. When using phenol as the selective solvent and when adding from 25% to 50% by volume of water based upon total volume of the extract phase, it has been found that desirable results are secured by heating the aqueous extract mixture to a temperature in the range from about 175° F. to 250° F. The temperature of the extract stripper and the quantity of steam introduced are adjusted to produce a solvent-free extract.

The secondary solvent used in solvent treating the separated phenol water phases may be any solvent which has a preferential selectivity for the more highly aromatic materials retained in the solvent water phase. In general, this material is preferably a lower boiling highly paraffinic material. Suitable solvents of this class are, for example, a highly paraffinic petroleum fraction boiling in the kerosene range from about 250° F. to 600° F., or a paraffinic material boiling in the range from 300° F. to 500° F. The operating conditions maintained in the re-extraction of the phenol water phase are adapted to secure the complete removal of highly aromatic oil from the solvent. When using phenol in the treatment of petroleum oils, it has been found that substantially complete removal of the highly aromatic materials from the phenol is secured by treating with one-half to 4 volumes of secondary solvent. When using highly paraffinic secondary solvent boiling in the range from about 300° F. to 500° F., it has been found that the oil is removed from the primary solvent by re-extracting the primary solvent with about one-half volume of secondary solvent. Preferred operating conditions are atmospheric pressure and a temperature in the range from about 160° F. to 235° F., the higher temperature in general being preferred.

The extract phenol water phase free of highly aromatic oil fractions is then cooled to a temperature at which a phenol phase and a phenolic water phase form. This temperature is preferably in the range from 60° F. to 100° F. The conditions maintained in the phenol drier are adjusted to produce substantially anhydrous phenol, or phenol of any desired low water content.

When using solvents other than phenol, the system is practically identical but the temperatures maintained in the various zones are adjusted to secure optimum operation. For example, if cresol is used as a primary solvent, the temperatures maintained in the solvent and extract separators would be in the range from about 275° F. to 325° F. When furfural is used, the temperatures in the solvent and extract separators would be in the range from about 225° F. to 275° F.

In order to further illustrate the invention, the following examples are given which should not be construed as limiting the same in any manner whatsoever:

*Example 1*

A petroleum oil having a gravity of about 25° A. P. I., a Saybolt viscosity of 450 seconds at 100° F. and about 60 seconds at 210° F. when treated with 200 parts by volume of phenol at a temperature of about 140° F. in accordance with the process of the present invention results in the following yields:

| | Primary extraction tower | | | | |
|---|---|---|---|---|---|
| | Total volumes feed | | | Total withdrawn | |
| | Oil | Phenol | Water injected | Raffinate phase | Extract phase |
| Oil | 100 | | | 75 | 25 |
| Phenol | | 200 | 1 | 25 | 176 |
| Water | | | 10 | | 10 |
| Total | 100 | 200 | 11 | 100 | 211 |
| | | 311 | | 311 | |

| | Raffinate separator | | | | |
|---|---|---|---|---|---|
| | Feed | | | Phases withdrawn | |
| | Raffinate phase from tower | Water injected | Total feed | Raffinate phase | Phenol water phase |
| Oil | 75 | 0 | 75 | 75 | 0 |
| Phenol | 25 | 1.5 | 26.5 | 2 | 24.5 |
| Water | | 15 | 15 | 0 | 12.0 |
| | 100 | 16.5 | 116.5 | 77 | 36.5 |

| | Raffinate stripper | | | |
|---|---|---|---|---|
| | Feed | | Withdrawn | |
| | Raffinate phase | Steam | Raffinate | Overhead |
| Oil | 75 | | 75 | |
| Phenol | 2 | | | 2 |
| Water | | 2 | | 2 |
| Total | 77 | 2 | 75 | 4 |
| | 79 | | 79 | |

| | Extract separator | | | | |
|---|---|---|---|---|---|
| | Feed | | | Phases withdrawn | |
| | Extract phase | Water injected | Total | Extract phase | Phenol water phase |
| Oil | 25 | | 25 | 21 | 4 |
| Phenol | 176 | 17.5 | 193.5 | 2 | 191.5 |
| Water | 10 | 175 | 185 | | 185 |
| | 211 | 192.5 | 403.5 | 23 | 380.5 |

| | Extract stripper | | | |
|---|---|---|---|---|
| | Feed | | Withdrawn | |
| | Extract phase | Steam | Overhead from solvent scrubber | Extract | Overhead |
| Oil | 21 | | 4 | 25 | |
| Phenol | 2 | | 10 | | 12 |
| Water | Trace | 2 | | | 2 |
| Kerosene | | | 97 | | 97 |
| Total | 23 | 2 | 111 | 25 | 111 |
| | | 136 | | 136 | |

| | Feed to solvent scrubber | | | | | |
|---|---|---|---|---|---|---|
| | Phenol-water phase from extract separator | Phenol-water phase from raffinate separator | Overhead from raffinate stripper | Overhead from extract stripper | Overhead from phenol drier | Total feed |
| Oil | 4 | | | | | 4 |
| Phenol | 191.5 | 24.5 | 2 | 12 | 10 | 240 |
| Water | 185 | 15 | 2 | 2 | 75 | 279 |
| Kerosene | | | | 97 | 3 | 100 |
| | 380.5 | 39.5 | 4 | 111 | 88 | 623 |

| | Withdrawn from solvent scrubber | |
|---|---|---|
| | Overhead to extract stripper | Phenol-water phase to phenol separator |
| Oil | 4 | |
| Phenol | 10 | 230 |
| Water | | 279 |
| Kerosene | 97 | 3 |
| | 111 | 512 |

| | Phenol separator | | | |
|---|---|---|---|---|
| | Feed | Withdrawn | | |
| | | Recycled Phenolic water | Steam discarded | Phenol to drier |
| Oil | | | | |
| Phenol | 230 | 20 | | 210 |
| Water | 279 | 200 | 4 | 75 |
| Kerosene | 3 | | | 3 |
| | 512 | 220 | 4 | 288 |

| | Phenol drier | | | |
|---|---|---|---|---|
| | Feed | Withdrawn | | |
| | | Overhead to solvent scrubber | Recycled phenol | |
| Oil | | | | |
| Phenol | 210 | 10 | 200 | |
| Water | 75 | 75 | | |
| Kerosene | 3 | 3 | | |
| | 288 | 88 | 200 | |
| Total | 288 | 288 | | |

*Example 2*

In order to illustrate the unexpected advantage secured by the two-stage process of the present invention over either the process in which water alone is used or in which a re-extraction operation alone is used, various operations were conducted with the following results:

A spent phenol containing extract oil was washed at 200° F. with various amounts of water with the following results:

| Volume percent of wash used (based upon spent phenol) | Percent oil in recovered phenol |
|---|---|
| 50 | 7.8 |
| 100 | 4.5 |
| 200 | 4.0 |
| 400 | 4.0 |

From the above data, it is apparent that highly aromatic materials cannot be effectively removed from phenol by a mere washing operation.

Various other operations were conducted in accordance with the two-stage process of the present invention in which spent phenol containing 12% extract was treated with the following results:

| Volume percent of water used | Volume percent of secondary solvent used (based upon spent phenol) | Percent oil in recovered phenol |
|---|---|---|
| 50 | 50 | 2 |
| 50 | 100 | 1.5 |
| 100 | 50 | 1.5 |
| 100 | 100 | 1.0 |

The above invention is not to be limited by any theory or mode of operation, but only by the following claims in which it is desired to claim all novelty insofar as the prior art permits.

I claim:

1. Solvent treating process comprising treating a petroleum oil with a primary solvent selected from the class of solvents which have a preferential selectivity for the more aromatic type compounds as compared to the more paraffinic type compounds under conditions to form a raffinate phase and a primary solvent extract phase, separating said raffinate phase and removing the primary solvent therefrom, separating said primary solvent extract phase and removing the solvent therefrom by segregating the extract into a more aromatic fraction and into a less aromatic fraction by the addition of a precipitant to said primary solvent extract phase whereby a phase comprising the more aromatic fraction and a phase comprising the less aromatic fraction are formed, distilling said phase comprising the less aromatic fraction in a manner adapted to segregate said less aromatic fraction, re-extracting said phase comprising the more aromatic fraction with a secondary solvent having a preferential selectivity for said more aromatic fraction under conditions to form a secondary solvent extract phase, separating said secondary solvent extract phase and removing the secondary solvent therefrom, combining the solvent-free less aromatic fraction with the solvent-free more aromatic fraction to form a solvent-free extract.

2. Process in accordance with claim 1 in which said primary solvent is phenol, said precipitant is water, and said secondary solvent is a highly paraffinic hydrocarbon oil boiling in the range from about 300° F. to 500° F.

3. Process in accordance with claim 1 in which said phase comprising the less aromatic fraction and said secondary solvent extract phase are distilled in the same zone under conditions adapted to remove as a bottoms therefrom a solvent-free extract comprising said less aromatic fraction and said more aromatic fraction.

4. Solvent treating process comprising treating a petroleum oil with a primary solvent selected from the class of solvents which have a preferential selectivity for the relatively more aromatic type constituents as compared to the relatively more paraffinic type constituents under conditions to form a primary solvent extract phase and a raffinate phase, separating the primary solvent extract phase, adding a precipitant thereto under conditions to form a phase comprising the less aromatic extract constituents and a phase comprising the more aromatic extract constituents, separating the respective phases and removing the primary solvent from said phase comprising the less aromatic extract constituents by distillation, removing the primary solvent from the phase comprising the more aromatic extract constituents by re-extracting said phase with a secondary solvent having a preferential selectivity for the more aromatic extract constituents as compared to said primary solvent under conditions to form a secondary solvent extract phase, separating this latter phase and removing the secondary solvent from the more aromatic extract phase by distillation, combining said less aromatic extract constituents and said more aromatic extract constituents to form a final solvent-free extract.

5. Process in accordance with claim 4 in which said primary solvent is phenol, said precipitant is water, and said secondary solvent is a highly paraffinic hydrocarbon oil boiling in the range from about 300° F. to 500° F.

6. Process in accordance with claim 4 in which said phase comprising the less aromatic extract fractions and the secondary solvent extract phase are distilled in the same zone under conditions whereby a solvent-free extract comprising the less aromatic extract fractions and the more aromatic extract fractions are removed as a bottoms.

JAMES M. WHITELEY, Jr.